July 18, 1961

W. N. POUNDSTONE 2,992,725

ENDLESS BELT CONVEYOR

Filed Nov. 22, 1957

INVENTOR.
WILLIAM N. POUNDSTONE
BY
Stanley J Price
HIS ATTORNEY

INVENTOR.
WILLIAM N. POUNDSTONE
BY
HIS ATTORNEY

July 18, 1961

W. N. POUNDSTONE 2,992,725

ENDLESS BELT CONVEYOR

Filed Nov. 22, 1957

INVENTOR.
WILLIAM N. POUNDSTONE
BY
Stanley J. Price
HIS ATTORNEY

United States Patent Office 2,992,725
Patented July 18, 1961

2,992,725
ENDLESS BELT CONVEYOR
William N. Poundstone, Morgantown, W. Va., assignor to Consolidation Coal Company, a corporation of Pennsylvania
Filed Nov. 22, 1957, Ser. No. 698,085
12 Claims. (Cl. 198—203)

This invention relates to an endless belt conveyor and a drive mechanism therefor and more particularly to an endless belt conveyor drive mechanism having an improved belt centering means.

Certain features of the structure disclosed but not claimed herein are more completely disclosed and claimed in United States Patent application Serial No. 698,273 entitled, "Extensible Belt Conveyor," filed on November 22, 1957 by William N. Poundstone.

The principal criticism of present day endless belt conveying systems is their relative immobility. This criticism has become more pronounced with the advent of continuous mining and of product quality control. The continuous miner advances rapidly in the headings and frequent moves and extension of the conveyor belt are required. To be able to maintain the same pace as the continuous miner, the various portions of the conveying system must be mobile and easy to assemble. This mobility is also an important factor when the entire mining operation shifts from one heading to another because of quality requirements of the mined product.

My new drive mechanism is mounted on propelling wheels so that it may be easily transported to various sections of the mine. My drive mechanism also has self contained roof and floor jacks that provide a speedy means to fixedly secure the drive mechanism in any desired position. These self contained jacks eliminate the use of cribbing and pillars. The drive pulleys on my drive mechanism are adjustable after the drive mechanism has been fixedly secured in the haulageway. The adjustment mechanism eliminates the necessity of dismantling the drive mechanism, that is, removing the cribbing and pillars, to properly align the reaches of the conveyor belt. This alignment can now be accomplished after my drive mechanism is positioned and fixedly secured to the mine roof or walls.

Accordingly the principal object of this invention is to provide a portable track mounted drive mechanism that is easily transportable to various sections of the mine.

Another object of this invention is to provide a drive mechanism having an improved belt centering means.

A further object of this invention is to provide a portable self contained drive mechanism having an improved means to fixedly secure the drive mechanism in operative position.

A further object of this invention is to provide a drive mechanism which is arranged transversely to the conveying reach of the belt mechanism.

One of the features of my drive mechanism is a subframe member that is supported by and adjustable relative to a base frame member.

Another feature of my drive mechanism is the self contained jack members that are connected to and form a part of the drive mechanism and are employed to fix a drive mechanism in operative position.

Another feature of my invention is the wheel mounted frame member.

Another feature of my invention is the flanged wheel propelling means that enables a drive mechanism to be moved into position on tracks without having to load and unload the drive mechanism from a carrier member.

Another feature of my invention is the ability to position the drive mechanism in a transverse entry located a substantial distance away from the discharge terminus.

These and other objects and features of my invention will be more completely disclosed and described in the following specification, the accompanying drawings and the appended claims.

In the accompanying drawings there are clearly and fully illustrated two embodiments of this invention, in which drawings.

Figure 2:
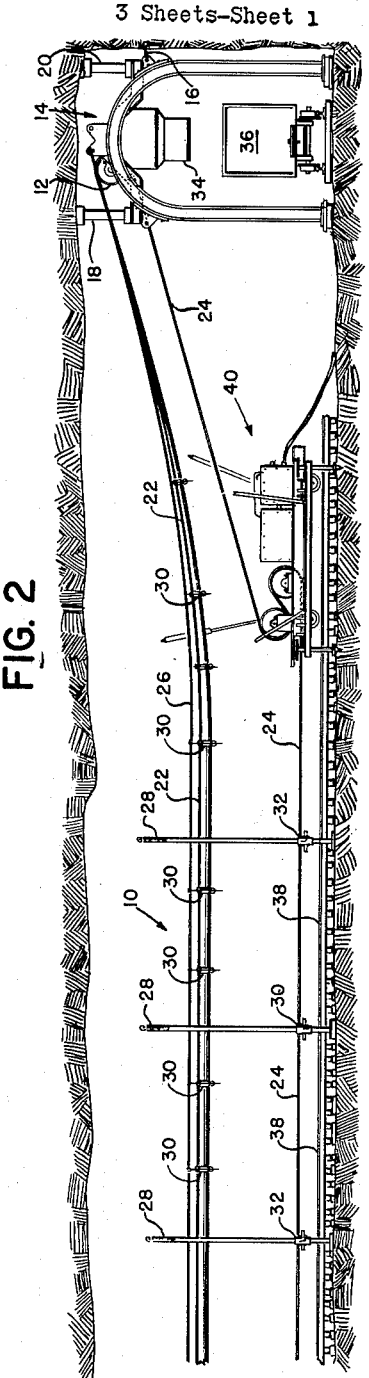
FIGURE 2 is a view in side elevation of the discharge terminus and a portion of an endless belt conveyor illustrating the other embodiment of my drive mechanism.

Referring to the drawings and particularly FIGURE 2, there is illustrated a conveyor belt mechanism generally designated by the numeral 10 that is supported at its discharge end or discharge terminus by a head pulley 12. The head pulley 12 is in turn operatively carried in an elevated position by an arch shaped bridging structure 14 that is secured to the mine haulageway wall by an anchoring cable 16 and to the mine roof by posts 18 and 20.

The conveyor belt 10 has a conveying reach 22 and a return reach 24. The conveying reach 22 is supported between the bridging structure 14 and a loading terminus or tailpiece (not shown) by means of a pair of parallel spaced flexible strands 26. The flexible strands 26 are secured at one end to the bridging structure 14 and at the other end to the tailpiece and maintained in tension therebetween.

The spaced flexible strands 26 are supported at predetermined intervals along their lengths by stands 28. Troughing idler assemblies 30 extend transversely to and are secured to both of the flexible strands 26 to support the conveyor belt conveying reach 22 therebetween. The stands 28 also have idler rollers 32 adjacent their lower portions which are arranged to support the conveying belt return reach 24.

The bridging structure 14 includes a flygate chute 34 that is positioned to distribute the material discharged from the conveying reach 22 into track mounted mine cars 36. The bridging structure 14 is so arranged that it straddles the track mounted mine cars 36 so that the trajectory of the material discharged from the conveying reach 22 is into the flygate chute 34 and thence into the track mounted mine cars 36 resulting in a minimum of spillage at the discharge terminus. Positioned below and substantially parallel to the conveying reach 22 are a pair of spaced parallel tracks 38. A drive mechanism generally indicated by the numeral 40 is mounted on the tracks 38 and is movable longitudinally relative to the conveyor belt 10. The drive mechanism 40 is arranged to pull the conveyor belt 10 around the head pulley 12 and thereby convey the material on the conveyor belt from the loading terminus to the discharge terminus. As will be later described, means are provided to fixedly position the drive mechanism in the haulageway and to also center the conveyor belt thereon.

Figure 3:
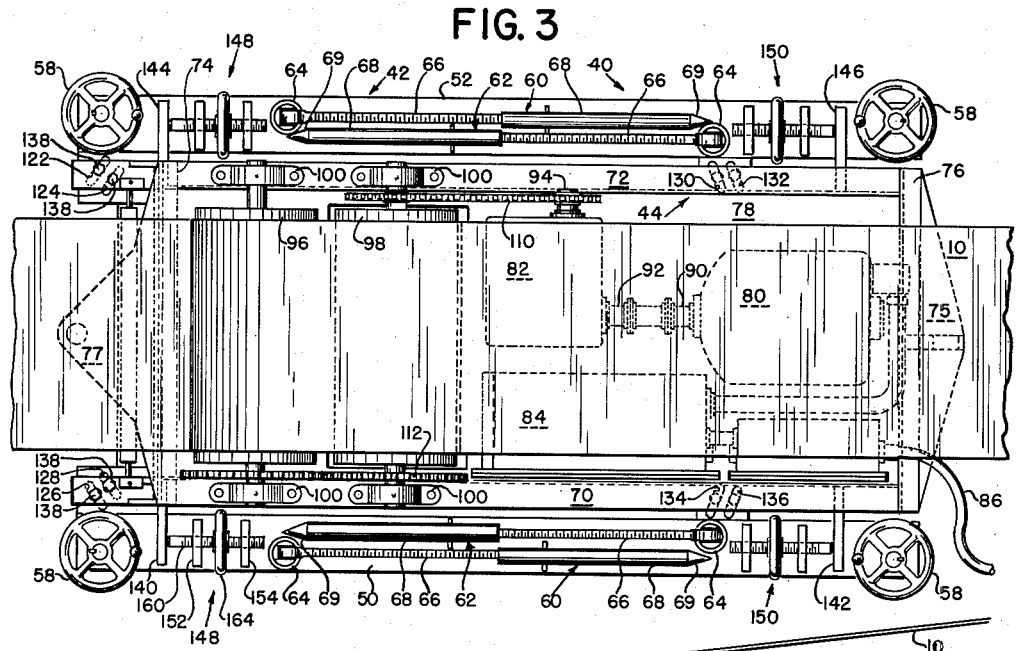
FIGURE 3 is a top plan view of the embodiment of my drive mechanism illustrated in FIGURE 2.
Figure 4:
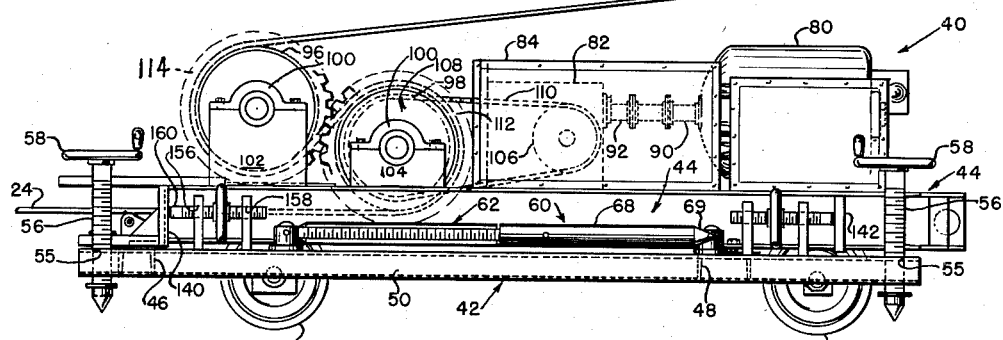
FIGURE 4 is a view in side elevation of the drive mechanism illustrated in FIGURE 3.
Figure 5:
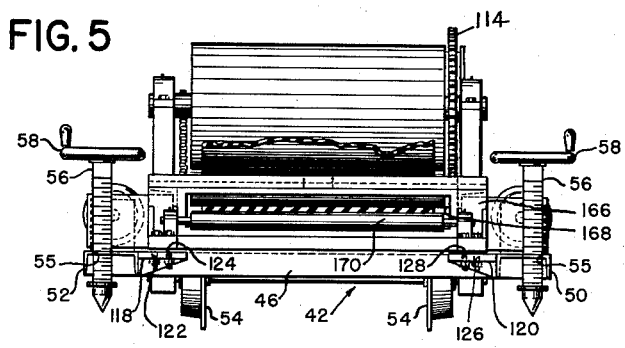
FIGURE 5 is a view in front elevation of the drive mechanism illustrated in FIGURES 3 and 4.

Now referring to FIGURES 3, 4 and 5, the drive mechanism 40 is illustrated in detail. The drive mechanism 40 includes a base frame 42 with a subframe 44 supported thereon. As viewed in FIGURES 3 and 4 the base frame 42 has a pair of transverse channels 46 and 48 and a pair of longitudinal spaced channels 50 and 52. The longitudinal channels 50 and 52 are secured to the transverse channels 46 and 48 and are thereby maintained in fixed parallel spaced relation to each other. Pairs of flanged type wheels 54 are operatively connected to the base frame 42 and are arranged to propel the drive mechanism 40 on the tracks 38. The wheels 54 are arranged adjacent the inner downwardly extending flange of the channels 50 and 52 as is illustrated in FIGURE 5. The horizontal webs of longitudinal channels 50 and 52 have threaded apertures 55 therethrough adjacent their end portions (FIGURES 4 and 5). Jack members 56 are threadably secured in the four apertures 55 and are arranged to move vertically therein. The jacks 56 have wheel type handles 58 secured to their upper end. The wheels 58 are employed to rotate the jacks 56 in the apertures 55. The jacks 56 are operable by downward movement to contact the mine floor and raise or lift the drive mechanism 40 so that the wheels 54 are free of the tracks 38 and the subframe 44 is essentially supported on an elevated platform which in this instance is the base frame 42 elevated by the jacks 56.

The longitudinal channels 50 and 52 have a pair of roof jacks 60 and 62 swivelly secured thereto as at 64. The pairs of roof jacks 60 and 62 include a threaded shaft 66 and an internally threaded tubular member 68 having a pointed end 69. The tubular member 68 is coaxially arranged on and threadedly secured to the threaded shaft 66 and the tubular member 68 upon rotation is operable to move telescopically on the threaded shaft 66. The pairs of roof jacks 60 and 62 serve as a means to fixedly secure the base frame 42 in the haulageway by wedging the pointed ends 69 into the mine roof or walls.

With the heretofore described construction the drive mechanism may be fixedly positioned in the haulageway by first elevating the drive mechanism 40 by means of the jack members 56. This is accomplished by moving the jack members 58 downwardly in the apertures 55 until the base frame 42 is elevated. Next the roof jacks are moved into position against the haulageway roof or walls to oppose the forces exerted by the conveyor belt. With my construction the elevating jacks 56 and the roof jacks 60 and 62 eliminate all cribbing and timbering that was formerly required to properly position and secure the conventional drive mechanism.

The subframe 44 is constructed to be adjustable relative to the base frame 42. The subframe 44 is rotatably adjustable so that the longitudinal axes of the drive pulleys may be changed or adjusted relative to the fixed base frame 42. This adjustment feature of the subframe 44 enables the conveyor belt 10 to be centered on the drive pulleys after the drive mechanism 40 has been fixedly positioned in the haulageway.

The detailed construction of the drive mechanism is as follows. The subframe 44 is positioned in overlying relation to the base frame 42 and has a pair of longitudinal channels 70 and 72. The channels 70 and 72 are maintained in fixed spaced relation to each other and between the base frame channels 50 and 52 by means of transverse connecting members 74 and 76. The rear transverse connecting channel 76 has a triangular plate 75 extending horizontally and rearwardly therefrom. The plate 75 serves as a means to couple the drive mechanism 40 to other propelling means. Similarly the front transverse connecting member 74 has a triangular plate 77 secured thereto and extending horizontally therefrom. The plate 77 is also employed as a coupling means. A floor plate 78 is secured to the longitudinal channels 70 and 72 and supports a drive motor 80, a gear reducer 82, and a motor starting device 84. A conduit 86 is connected at one end to the motor starting and is arranged to be connected at the other end to a source of electricity to thereby supply current to the electric motor 80. The electric motor 80 has an output shaft 90 that is coupled to an input shaft 92 of gear reducer 82. The reducer 82 has an output shaft 94 extending laterally therefrom.

A pair of drive pulleys 96 and 98 are secured to and extend transversely between the subframe channels 70 and 72. The pulleys 96 and 98 are supported on pairs of vertical carriers 102 and 104 (FIGURE 4). The vertical carriers 102 are so constructed that the drive pulley 96 is above the drive pulley 98. The vertical carriers 102 and 104 have pillow block type bearings 100 secured to their upper portions and the shafts of the respective drive pulleys 96 and 98 are supported in these pillow block bearings 100.

The reducer output shaft 94 has a sprocket 106 secured thereto and the shaft of drive pulley 98 has a second sprocket 108 secured thereto. An endless chain 110 extends around both sprockets 106 and 108 to drivingly connect the reducer output shaft 94 to the shaft of drive pulley 98. The drive pulley 98 has a gear 112 secured to its shaft on the opposite side of the roller and the pulley 96 has a gear 114 secured to its shaft on the same side as gear 112. Gears 112 and 114 mesh with each other to drivingly connect the drive pulley 96 to drive pulley 98.

The detailed construction of the adjustment mechanism is as follows. The base frame 42 has a pair of inwardly extending plate members 118 and 120 adjacent its front end (FIGURE 5). The plate members 118 and 120 are secured to the downwardly extending inner flange of channels 50 and 52 and to the front downwardly extending flange of transverse connecting channel 46. The plate member 118 has a pair of curved slotted apertures 122 and 124 and the plate 120 has a similar pair of curved slotted apertures 126 and 128. The rear base frame transverse connecting channel 48 has a first pair of slotted apertures 130 and 132 adjacent the longitudinal channel 50 and a second pair of curved slotted apertures 134 and 136 adjacent the other longitudinal channel 52. The subframe longitudinal channels 70 and 72 have apertures through their lower flanges which are aligned with the aforementioned slotted apertures in the base frame plates 118 and 120 and the base frame transverse channel 48. Bolts 138 extend through each of the aligned apertures in the subframe longitudinal channels 70 and 72 and through the respective curved slotted apertures 122, 124, 126, 128, 130, 132, 134 and 136. The bolts 138 when tightened in receiving nuts rigidly secure the subframe 44 to the base frame 42.

The subframe longitudinal channel 70 has a first plate 140 secured thereto adjacent the front end and extending outwardly therefrom laterally and a second plate 142 extending outwardly therefrom adjacent the rear end of the drive mechanism. The plates 140 and 142 are positioned above the web portion of the base frame channel 50. Similarly the subframe longitudinal channel 72 has a plate 144 secured thereto adjacent the front end and extending laterally therefrom; and a second plate 146 secured through and extending laterally therefrom adjacent the rear portion of the drive mechanism. The plates 144 and 146 are positioned above the web portion of the base frame longitudinal channel 52. Each of the base frame longitudinal channels 50 and 52 has a pair of adjusting mechanisms generally designated by the numerals 148 and 150.

The adjusting mechanisms 148 and 150 are similar in construction and include a pair of vertical plate members 152 and 154 which are arranged in spaced relation to each other and secured to the web portion of the respective base frame longitudinal channels 50 and 52. The plate members 152 and 154 have aligned threaded apertures 156 and 158 therethrough and an externally threaded adjusting rod 160 extends through the threaded apertures 156 and 158 in horizontal relation to the base frame longitudinal channels 50 and 52. The threaded rod front end portion 162 is arranged to abut the respective plates 140, 142, 144 and 146. A hand wheel 164 is secured to the externally threaded rod 160 between the vertical plates 152 and 154. By rotation of the respective wheels 164 the threaded rods 160 are moved longitudinally relative to the respective base frame channels 50 and 52 to exert a force on the respective lateral plates 140, 142, 144 and 146 which, as stated, are secured to the subframe 44. Depending on the direction of the force exerted by the respective adjusting mechanisms 148 and 150 the subframe 44 pivots or rotates relative to the base frame 42. In this manner the drive rollers 96 and 98 which are secured to the subframe 44 are adjusted laterally relative to the fixed base frame 42 to center the conveyor belt 10 thereon. This adjustment of the subframe is intended to be accomplished after the base frame 42 is rigidly fixed relative to the haulageway.

This adjustment feature of the drive pulleys 96 and 98 eliminates the former practice of first setting up the drive mechanism, cribbing and posting the mechanism to fixedly position it in the haulageway and then tensioning the belt thereon. If the belt were not exactly centered on the drive rollers, the posting and cribbing would be removed and the entire drive mechanism would be adjusted to center the belt.

The subframe transverse connecting member 74 has a guide plate 166 depending therefrom and secured thereto (FIGURE 5). The guide plate 166 has a transverse slotted portion 168 through which the conveyor belt return reach 24 extends. An idler roller 170 is secured to the plate 166 parallel with the lower edge of the slotted portion 168 and serves to support the conveyor belt return reach 24 as it leaves the drive mechanism 40.

*Lateral embodiment of the drive mechanism*

Figure 1:
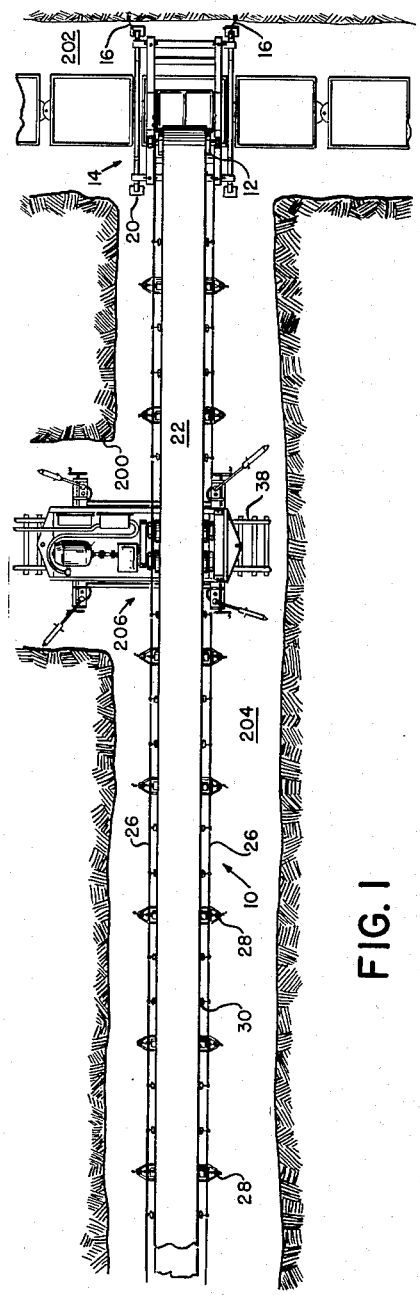
FIGURE 1 is a top plan view of the discharge terminus and a portion of the endless conveyor mechanism illustrating one embodiment of my improved drive mechanism.

Referring particularly to FIGURE 1 there is illustrated another embodiment of my drive mechanism. The conveyor mechanism is similar in many respects to the conveyor mechanism illustrated in FIGURE 2 and has a conveyor belt generally designated by the numeral 10 that is supported at its discharge end by a head pulley 12. The head pulley 12 is supported in an elevated position by means of a bridging structure 14, which is similarly secured to the mine wall by anchoring cables 16 and to the mine roof by posts 18 and 20.

The conveyor belt 10 has a conveying reach 22 that is supported between the bridging structure 14 and the loading terminus by means of a pair of flexible strands 26 which are secured at one end to the bridging structure 14 and at the other end to the tailpiece and maintained in tension therebetween. The stands 28 support the flexible strands 26 at predetermined intervals and idler roller assemblies 30, which are secured to the pair of flexible strands 26, support the belt conveyor conveying reach 22. In this embodiment the tracks 38 extend transversely to the conveying reach 22 and are positioned in a heading 200 that is parallel to the main haulageway 202 and lateral to the conveyor haulageway 204. A drive mechanism generally designated by the numeral 206 is mounted on the transverse tracks 38 and is movable thereon. The drive mechanism 206 is arranged to pull the conveyor belt 10 around the head pulley 12 and thereby convey material from the loading terminus to the discharge terminus on the conveying reach 22. The drive mechanism 206 also includes a means to fixedly position the drive mechanism in the heading and conveyor haulageway 204 and also a means to center the conveyor belt 10 on the drive pulleys.

Figure 6:
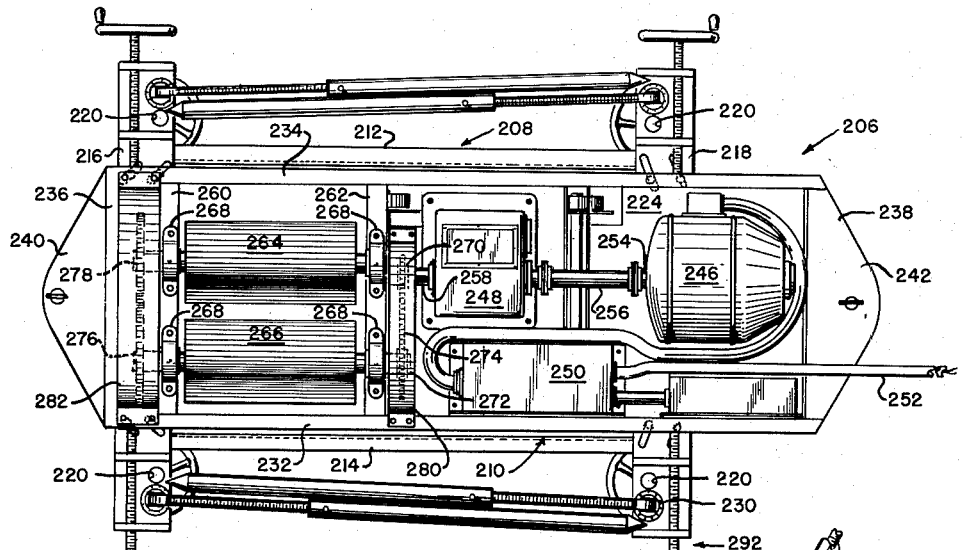
FIGURE 6 is a top plan view of the embodiment of my drive mechanism illustrated in FIGURE 1.
Figure 7:
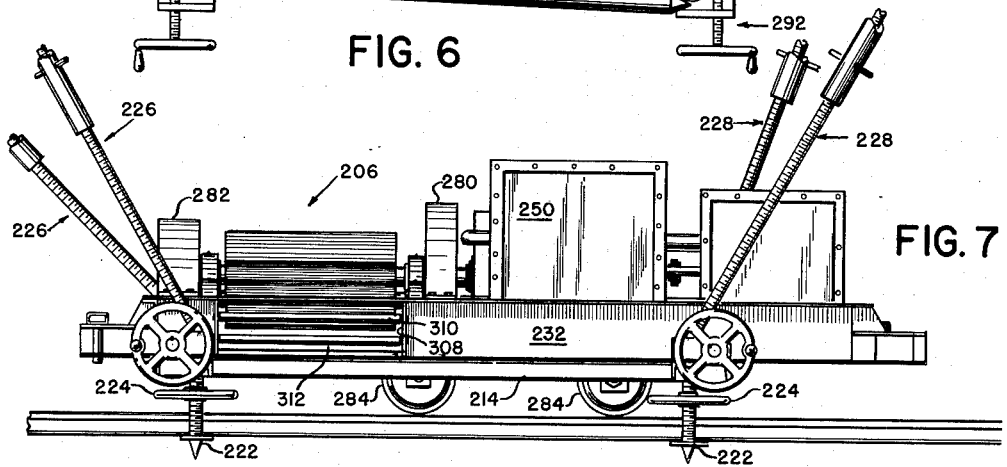
FIGURE 7 is a view in side elevation of the drive mechanism illustrated in FIGURE 6.
Figure 8:
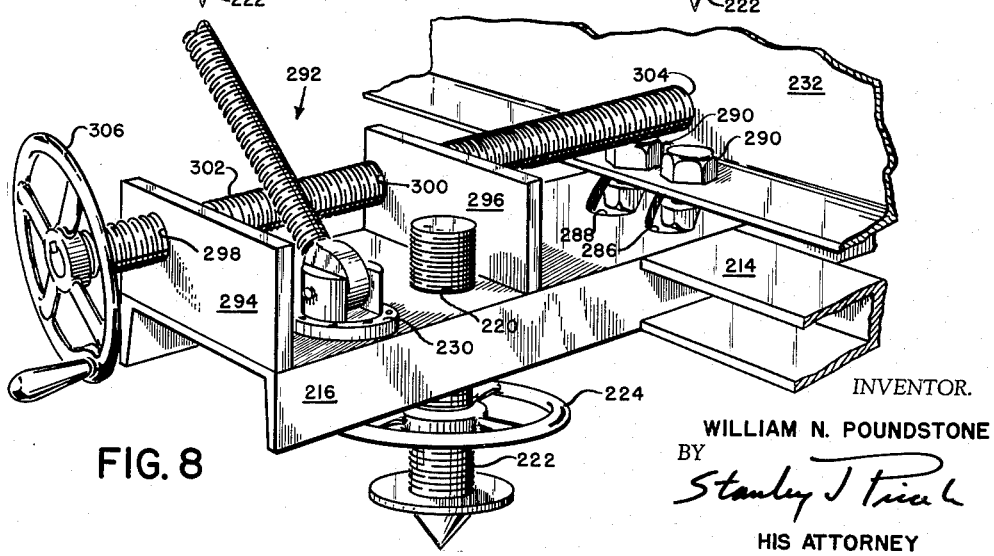
FIGURE 8 is an enlarged prospective view of the adjusting mechanism and supporting mechanism.

Now referring to FIGURES 6 and 7 the drive mechanism 206 is illustrated in detail. The drive mechanism 206 has a base frame generally designated by the numeral 208 and a subframe 210 that is positioned on the base frame 208. In FIGURE 6 the base frame is illustrated as having a pair of longitudinal channels 212 and 214. The longitudinal channels are secured to a pair of transverse channels 216 and 218. The longitudinal channels 212 and 214 are secured to the transverse channels 216 and 218 inwardly of the end portions of channels 216 and 218. With this construction the transverse channels 216 and 218 have overhanging free end portions. The free end portions of the transverse channels 216 and 218 each have threaded apertures 220 therethrough which are adapted to receive jack members 222 (FIGURES 7 and 8). The jack members 222 are threadedly secured in the apertures 220 and are arranged to move vertically therein. Hand wheels 224 are secured to each of the jack members below the transverse channels 216 and 218. The jacks 222 are operable by downward movement to contact the mine floor and elevate the entire drive mechanism 206. The transverse channels 216 and 218 have a pair of roof jacks 226 and 228 swivelly secured thereto as at 230. The roof jacks 226 and 228 are similar in construction to the roof jacks 60 and 62 previously described in reference to the first embodiment. The roof jacks 226 and 228 serve as a means to secure the base frame 208 against the haulageway roof or walls and thereby fixedly position the base frame 208.

The subframe 210 is positioned in overlying relation with the base frame 208 and has a pair of longitudinal channels 232 and 234 that are secured to each other in fixed parallel relation by transverse connecting members 236 and 238. The transverse connecting members 236 and 238 include horizontal triangular plates 240 and 242 that are employed to couple the drive mechanism to other propelling means. A floor plate 244 is secured to the subframe longitudinal channels 232 and 234. The floor plate 244 supports a drive motor 246 and gear reducer and a motor starting device 250. A conduit 252 connects the starting device 250 to a fixed source of electricity. The motor 246 has an output shaft 254 that is coupled to a gear reducer input shaft 256. The gear reducer 248 has an output shaft 258 that is parallel to its input shaft 256 and extends from its opposite side. The subframe 210 has a pair of spaced pulley carriers 260 and 262 secured to the longitudinal channels 232 and 234. Carried by the pulley carriers 260 and 262 are a pair of drive pulleys 264 and 266. The pulley carriers 260 and 262 are so constructed that the pulley 264 is higher than pulley 266. Pillow block type bearings 268 rotatably secure the drive pulleys 264 and 266 to the pulley carriers 260 and 262. It should be noted that the drive pulleys 264 and 266 are arranged parallel to the longitudinal channels 232 and 234.

The gear reducer output shaft 258 has a sprocket 270 secured thereto and the drive pulley 266 has a second sprocket 272 secured thereto in aligned relation with the pulley 270. An endless chain 274 drivingly connects the drive pulley 266 to the reducer 248. The drive pulley 266 has gear 276 secured to the opposite end of its shaft and the drive pulley 264 has a gear 278 secured to its shaft. Gears 276 and 278 mesh with each other to drivingly connect the drive pulley 264 to drive pulley 266. A cover plate 280 covers the sprockets 270 and 272 and a second cover plate 282 covers the gears 276 and 278 on the opposite side of pulleys 264 and 266.

The drive mechanism 206 is supported on a plurality of propelling wheels 284. In this instance the propelling wheels are connected to the base frame 208. The wheels 284 could, however, with equal ease be secured to the subframe 210. With the wheels 284 secured to the base frame 208 the jacks 222 function primarily to limit the rolling movement of the drive mechanism on the propelling wheels 284. If the propelling wheels were mounted on the subframe 210 the jack members 222 would also serve to lift the propelling wheels 284 from the tracks 38 so that the subframe 210 could be adjusted relative to the base frame 208.

The subframe 210 is constructed to be adjustable relative to the base frame 208. The subframe 210 is adjustable so that the longitudinal axes of the drive pulleys 264 and 266 may be changed or adjusted relative to the fixed base member 208. The adjustment of the longitudinal axis of drive pulleys 264 and 266 enables the conveying belt 10 to be centered on the drive pulleys 264 and 266 to thereby properly train the conveyor belt conveying reach 22 and return reach 24.

The subframe 210 is adjustably connected to the base frame 208 by four sets of curved slotted apertures on the base frame transverse channels 216 and 218 and overlying aligned apertures in the subframe longitudinal channel flanges 232 and 234. The connecting arrangement is illustrated in detail in FIGURE 8 wherein the transverse channel 216 has a pair of curved slotted apertures 286 and 288 therein. The subframe longitudinal channel 232 has a pair of apertures in its lower flange which are aligned with the slotted apertures 286 and 288. Bolts 290 extend through the flanges in the subframe longitudinal channel 232 and the respective slotted apertures 286 and 288 in the web of the base frame transverse channel 216. The same arrangement of slots and apertures is present on the opposite side of base frame transverse channel 216 and on the transverse channel 218. When the bolts 290 are tightened in receiving nuts the subframe 210 is rigidly secured to the base frame 208.

The base frame transverse channels have a pair of adjusting mechanisms generally designated by the numeral 292 adjacent their free ends. The adjusting mechanisms include a pair of vertical spaced plates 294 and 296 (FIGURE 8). The plates 294 and 296 are secured to the respective base frame transverse channel web portions and have a pair of aligned threaded apertures 298 and 300. An externally threaded adjusting bar 302 extends through the apertures 298 and 300 and has its front end 304 in abutting relation with the web portion of the respective subframe longitudinal channels 232 and 234. A hand wheel 306 is secured to the externally threaded bar 302 and by rotation of the hand wheel 306 the threaded bar 302 is moved toward and away from the subframe channels 232 and 234. The adjusting mechanisms 292 are employed to pivot the subframe 210 in the slotted apertures of the transverse channels 216 and 218 at the base frame 208. With the adjusting mechanisms 292 the subframe 210 may be moved relative to the base frame 208 and thereby adjust the drive rollers 264 and 266 to center the conveyor belt thereon.

The drive mechanism 206 is adapted to be positioned laterally to the conveyor belt 10. In order to provide an exit for the return reach 24 of the conveyor the subframe longitudinal channel 232 has a cut away portion 308 with a pair of idler rollers 310 and 312. The conveyor belt, which is laced around the drive pulleys, leaves the drive mechanism through the cut away portion 308 between the idler rollers 310 and 312.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. An endless belt conveyor comprising in combination a flexible conveyor belt, a discharge terminus, and a portable belt driving mechanism, said discharge terminus having a head pulley secured thereto with said conveyor belt extending therearound, said belt drive mechanism having means adapted to independently position said belt drive mechanism at variable distances from said discharge terminus and means carried by said belt drive mechanism adapted to secure said belt drive mechanism in fixed spaced relation to said discharge terminus, drive pulleys carried by said belt drive mechanism adapted to frictionally engage said conveyor belt and having said conveyor belt laced therearound, and drive means for said drive pulleys carried by said belt drive mechanism.

2. An endless belt conveyor including a conveyor belt, a portable belt driving mechanism having a base frame and a subframe, said drive mechanism being mounted on a plurality of propelling wheels, said subframe carried by said base frame, a pair of drive pulleys carried by said subframe and having said conveyor belt laced therearound, drive means for said drive pulleys carried by said subframe, and means to adjust said subframe horizontally relative to said base frame to thereby center said conveyor belt on said drive pulleys.

3. An endless belt conveyor including a conveyor belt, a portable belt driving mechanism having a base frame and a subframe, said drive mechanism being mounted on a plurality of propelling wheels, said subframe carried by said base frame, a pair of drive pulleys carried by said subframe and having said conveyor belt laced therearound, drive means for said drive pulleys carried by said subframe, a plurality of adjustable roof jacks hingedly secured to said base frame and arranged to fixedly position said drive mechanism in a haulageway, and means to adjust said subframe horizontally relative to said base frame after said drive mechanism is fixedly positioned in said haulageway to thereby center said conveyor belt on said drive pulleys.

4. An endless belt conveyor including a conveyor belt, a portable belt drive mechanism having a base frame and a subframe, said drive mechanism being mounted on a plurality of propelling wheels, said subframe carried by said base frame, a pair of drive pulleys carried by said subframe and having said conveyor belt laced therearound, drive means for said drive pulleys carried by said subframe, a plurality of adjustable roof jacks hingedly secured to said base frame and arranged to fixedly position said drive mechanism in a haulageway, said base frame having a plurality of floor jacks depending therefrom and arranged upon actuation to elevate said drive mechanism relative to said haulageway, and means to adjust said subframe horizontally relative to said base frame after said drive mechanism is elevated and fixedly positioned in said haulageway to thereby center said conveyor belt on said drive pulleys.

5. An endless belt conveyor comprising in combination a flexible conveyor belt having an upper conveying reach and a lower return reach, a discharge terminus, and a portable belt driving mechanism, said discharge terminus having a head pulley secured thereto with said conveyor belt extending therearound, said drive mechanism mounted on a plurality of wheels adapted to independently position said drive mechanism at variable distances from said discharge terminus, said drive mechanism having an elongated frame member with side portions and end portions, a pair of drive pulleys arranged laterally on said frame member adjacent one end and carried by said frame side portions, said drive mechanism having means to secure itself in fixed spaced relation to said discharge terminus with said conveyor belt return reach laced around said drive pulleys in frictional engagement with said drive pulleys, and drive means for said drive pulleys carried by said frame.

6. An endless belt conveyor including a conveyor belt, a portable belt drive mechanism having a base frame and a subframe, said base frame mounted on a plurality of propelling wheels, said base frame having a pair of parallel side members with adjusting means secured adjacent their ends, said adjusting means including rod members movable longitudinally relative to said base frame side members, said subframe carried by said base frame and having parallel side members positioned inwardly of said base frame side members, said subframe side members each having vertical plate members extending outwardly therefrom adjacent their end portions and adjacent said respective rod members, means to secure said subframe to said base frame, a pair of drive pulleys arranged laterally on said subframe adjacent one end and carried by said subframe side portions, said conveyor belt laced around said drive pulleys, and drive means for said drive pulleys carried by said subframe, said rod members being operable upon longitudinal movement relative to said base frame side members to exert a force on said plate members and thereby pivot said subframe horizontally relative to said base frame to thereby center said conveyor belt on said drive pulleys.

7. An endless belt conveyor including a conveyor belt, a portable belt drive mechanism having a base frame and a subframe, said base frame mounted on a plurality of propelling wheels, said base frame having a pair of parallel side members with adjusting means secured adjacent their ends, said adjusting means including rod members movable longitudinally relative to said base frame side members, said subframe carried by said base frame and having parallel side members positioned inwardly of said base frame side members, said subframe side members each having vertical plate members extending outwardly therefrom adjacent their end portions and adjacent said respective rod members, means to secure said subframe to said base frame, a pair of drive pulleys arranged laterally on said subframe adjacent one end and carried by said subframe side portions, said conveyor belt laced around said drive pulleys, and drive means for said drive pulleys carried by said subframe, said base frame side members each having a pair of adjustable roof jacks hingedly secured thereto adjacent said adjusting means and arranged to fixedly position said drive mechanism in a haulageway, said rod members being operable upon longitudinal movement relative to said base frame side members to exert a force on said plate members and thereby pivot said subframe horizontally relative to said base frame and thereby center said conveyor belt on said drive pulleys after said drive mechanism is fixedly positioned in said haulageway.

8. An endless belt conveyor including a conveyor belt, a portable belt drive mechanism having a base frame and a subframe, said base frame mounted on a plurality of propelling wheels, said base frame having a pair of parallel side members with adjusting means secured adjacent their ends, said adjusting means including rod members movable longitudinally relative to said base frame side members, said subframe carried by said base frame and having parallel side members positioned inwardly of said base frame side members, said subframe side members each having vertical plate members extending outwardly therefrom adjacent their end portions and adjacent said respective rod members, means to secure said subframe to said base frame, a pair of drive pulleys arranged laterally on said subframe adjacent one end and carried by said subframe side portions, said conveyor belt laced around said drive pulleys, and drive means for said drive pulleys carried by said subframe, said base frame side members each having a pair of adjustable roof jacks hingedly secured thereto adjacent said adjusting means and arranged to fixedly position said drive mechanism in a haulageway, said base frame side members each having a pair of floor jacks depending therefrom and arranged upon actuation to elevate said base frame, said rod members being operable upon longitudinal movement relative to said base frame side members to exert a force on said plate members and thereby pivot said subframe horizontally relative to said base frame and thereby center said conveyor belt on said drive pulleys after said drive mechanism is elevated and fixedly positioned in said haulageway.

9. An endless belt conveyor comprising in combination a flexible conveyor belt having an upper conveying reach and a lower return reach, a discharge terminus, and a portable belt driving mechanism, said discharge terminus having a head pulley secured thereto with said conveyor belt extending therearound, said drive mechanism mounted on a plurality of wheels adapted to independently position said drive mechanism at variable distances from siad discharge terminus, said drive mechanism having an elongated frame member with side portions and lateral end portions, a pair of parallel pulley carrier members secured to said side portions and extending laterally therebetween, a pair of drive pulleys carried by said pulley carrier members and arranged longitudinally on said frame member parallel to and between said frame side portions adjacent one end of said frame member, and drive means for said drive pulleys carried by said frame, said drive mechanism having means to secure itself in fixed spaced relation to said discharge terminus with said frame member side portions extending transversely to said conveyor belt return reach with said return reach laced around said drive pulleys in frictional engagement with said drive pulleys.

10. An endless belt conveyor including a conveyor belt, a portable belt driving mechanism having a base frame and a subframe, said base frame mounted on a plurality of propelling wheels, said base frame having a pair of parallel side memebrs and a pair of parallel end members extending laterally to said side members, said end members having end portions extending outwardly beyond said side members, said end member end portions each having adjusting means secured thereto, each of said adjusting means including a rod member movable laterally relative to said base frame side members, said subframe carried by said base frame and having side members positioned inwardly of said base frame side members, means to secure said subframe to said base frame, said subframe having a pair of pulley carrier members secured to said side members and extending laterally therebetween, a pair of drive pulleys carried by said pulley carrier members and arranged longitudinally on said subframe parallel to and between said subframe side portions and adjacent one end of said subframe, said conveyor belt laced around said drive pulleys, and drive means for said drive pulleys carried by said subframe, said rod members being operable upon lateral movement relative to said base frame side members to exert a force on said subframe side members to thereby pivot said subframe horizontally relative to said base frame and thereby center said conveyor belt on said drive pulleys.

11. An endless belt conveyor including a conveyor belt, a portable belt driving mechanism having a base frame and a subframe, said base frame mounted on a plurality of propelling wheels, said base frame having a pair of parallel side members and a pair of parallel end members extending laterally to said side members, said end members having end portions extending outwardly beyond said side members, said end member end portions each having adjusting means secured thereto, each of said adjusting means including a rod member movable laterally relative to said base frame side members, said subframe carried by said base frame and having side members positioned inwardly of said base frame side members, means to secure said subframe to said base frame, said subframe having a pair of pulley carrier members secured to said side members and extending laterally therebetween, a pair of drive pulleys carried by said pulley carrier members and arranged longitudinally on said subframe parallel to and between said subframe side portions and adjacent one end of said subframe, said conveyor belt laced around said drive pulleys, drive means for said drive pulleys carried by said subframe, and said base frame end members each having a pair of adjustable roof jacks hingedly secured thereto adjacent said adjusting means and arranged to fixedly position said drive mechanism in a haulageway, said rod members being operable upon lateral movement relative to said base frame side members to exert a force on said subframe side members to thereby pivot said subframe horizontally relative to said base frame and thereby center said conveyor belt on said drive pulleys after said drive mechanism is fixedly positioned in said haulageway.

12. An endless belt conveyor including a conveyor belt, a portable belt driving mechanism having a base frame and a subframe, said base frame mounted on a plurality of propelling wheels, said base frame having a pair of parallel side members and a pair of parallel end members extending laterally to said side members, said end members having end portions extending outwardly beyond said side members, said end member end portions each having adjusting means secured thereto, each of said adjusting means including a rod member movable laterally relative to said base frame side members, said subframe carried by said base frame and having side members positioned inwardly of said base frame side members, means to secure said subframe to said base frame, said subframe having a pair of pulley carrier members secured to said side members and extending laterally therebetween, a pair of drive pulleys carried by said pulley carrier members and arranged longitudinally on said subframe parallel to and between said subframe side portions and adjacent one end of said subframe, said conveyor belt laced around said drive pulleys, drive means for said drive pulleys carried by said subframe, said base frame end members each having a pair of adjustable roof jacks hingedly secured thereto adjacent said adjusting means and arranged to fixedly position said drive mechanism in a haulageway, and said base frame end members each having a pair of floor jacks depending therefrom and arranged upon actuation to elevate said base frame, said rod members being operable upon lateral movement relative to said base frame side members to exert a force on said subframe side members to thereby pivot said subframe horizontally relative to said base frame and thereby center said conveyor belt on said drive pulleys after said drive mechanism is elevated and fixedly positioned in said haulageway.

References Cited in the file of this patent

UNITED STATES PATENTS

| | | |
|---|---|---|
| 1,596,803 | Callahan | Apr. 17, 1926 |
| 1,644,943 | Osgood | Oct. 11, 1927 |
| 1,977,147 | Rogers et al. | Oct. 16, 1934 |
| 2,689,717 | Bainbridge | Sept. 21, 1954 |
| 2,774,462 | Poundstone | Dec. 18, 1956 |

FOREIGN PATENTS

| | | |
|---|---|---|
| 278,972 | Great Britain | Oct. 20, 1927 |
| 331,917 | Germany | Jan. 17, 1921 |